United States Patent [19]
Curtis et al.
[11] 3,723,656
[45] Mar. 27, 1973

[54] TELEPHONE ANSWERING SYSTEM

[75] Inventors: Lawrence A. Curtis, Hunting Beach; Elmer C. Bonsky, Long Beach, both of Calif.
[73] Assignee: T.A.D. Avanti Inc., Paramount, Calif.

[22] Filed: Apr. 12, 1971
[21] Appl. No.: 132,961
[52] U.S. Cl. ....179/2 A, 179/6 E
[51] Int. Cl. ....H04m 11/10
[58] Field of Search ....179/2 A, 6 E, 2 C, 2 R, 1 C

[56] References Cited

UNITED STATES PATENTS

| | | | |
|---|---|---|---|
| 3,529,087 | 9/1970 | Kawase | 179/2 A |
| 3,360,777 | 12/1967 | Kolm | 179/2 A |
| 3,530,250 | 9/1970 | Schaum | 179/2 A |
| 3,548,102 | 12/1970 | Schaum | 179/2 A |

*Primary Examiner*—Kathleen H. Claffy
*Assistant Examiner*—David L. Stewart
*Attorney*—Jessup & Beecher

[57] ABSTRACT

A control system is provided which is constructed to activate automatically a telephone answering unit, or any other electrical device, after a predetermined number of telephone rings. The control system to be described includes an electronic circuit which responds to the incoming telephone rings, and which may be adjusted to energize a relay after predetermined number of rings, the relay serving to short circuit the power switch of the controlled instrument, and to maintain the controlled instrument in an energized state.

2 Claims, 3 Drawing Figures

INVENTORS:
Lawrence A. Curtis
Elmer C. Bonsky
Jump and Beecher
By Keith D. Beecher
ATTORNEYS

TELEPHONE ANSWERING SYSTEM

BACKGROUND OF THE INVENTION

The control system of the present invention may be used in conjunction with the telephone answering system and apparatus described, for example, in copending application, Ser. No. 52,636 which was filed July 6, 1970 in the name of Francis A. Foresta and Elmer C. Bonsky, and which is entitled "Telephone Answering Instrument and System." However, it will become apparent as the description proceeds, that the control system may be used to activate, or deactivate, any other electrical instrumentality in response to received telephone ring signals.

The telephone answering system and apparatus described in the copending application is of the type which includes a sensing circuit that responds to the ring signals on the telephone line to activate the answering instrument. When the instrument is so activated a recorded announcement is transmitted over the line to the calling party. A recording circuit is then activated within the answering instrument in order that the calling party may then record his message.

In the normal operation of the apparatus, it is turned off during the normal business day and the telephone is answered manually. However, whenever the business establishment is left unattended, it is usual to turn on the apparatus so that it may respond to the telephone rings to make the desired announcement and to record the incoming messages.

It often happens, however, with the usual prior art type of telephone answering equipment for the user to forget to turn the equipment on when he leaves the office and, as a result, many incoming calls are lost. With the control system of the present invention, when the apparatus is turned off, it still is capable of being activated after a pre-set number of telephone rings, so that if the telephone is not answered on the third or fourth ring, for example, the answering system and apparatus is automatically energized by the control circuit of the invention and it remains energized thereafter for all subsequent calls and until it is reset.

In addition, and as mentioned above, the control system of the present invention has general utility. Specifically, it may be used to activate, or deactivate, any electrical instrument in response to a telephone call from any remote point.

DETAILED DESCRIPTION OF THE ILLUSTRATED EMBODIMENT

Figure 1:
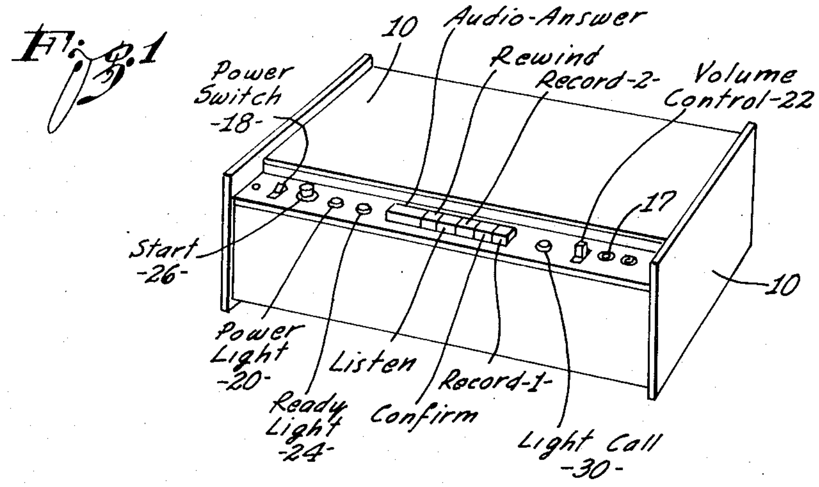
FIG. 1 is a perspective representation of a telephone answering unit similar to that described in the aforementioned copending application.

The telephone answering unit shown in FIG. 1 may be of the type described in the copending application which may be plugged into a usual telephone jack. The apparatus, as described in the copending application, preferably has the feature in that it operates independently of the telephone instrument. When activated, the apparatus of FIG. 1 answers on the first telephone ring, and it automatically transmits a recorded announcement over the phone line to the calling party; and it then enters a recording mode, so that a message from the calling party may be recorded for subsequent play-back.

The particular unit shown in FIG. 1 includes a housing 10 for the electrical control circuitry, and for supporting a control panel. A microphone may be plugged into a receptacle 17 on the control panel for recording announcements. A series of pushbutton switches are mounted on the control panel, and these are designated "Auto answer," "Rewind," "Listen," "Confirm," "Record 1" and "Record 2." A thumb operated "on-off" power switch is also located on the control panel, and a thumb actuated volume control 22 may also be mounted on the control panel. In addition, the control panel may support a series of indicator lights designated "Power," "Ready," "Call," these lights being designated 20, 24 and 30 in FIG. 1.

In order to install and operate the system of FIG. 1, it is plugged into the usual 110 volt AC outlet, and is also plugged directly into a telephone jack, or otherwise connected to the telephone line. In the manner described in detail in the copending application, the various push buttons of the unit are actuated in order that it may properly perform its intended function. Since these functions form no part of the present invention, a detailed description of the push buttons and associated circuitry will be omitted.

Figure 2:
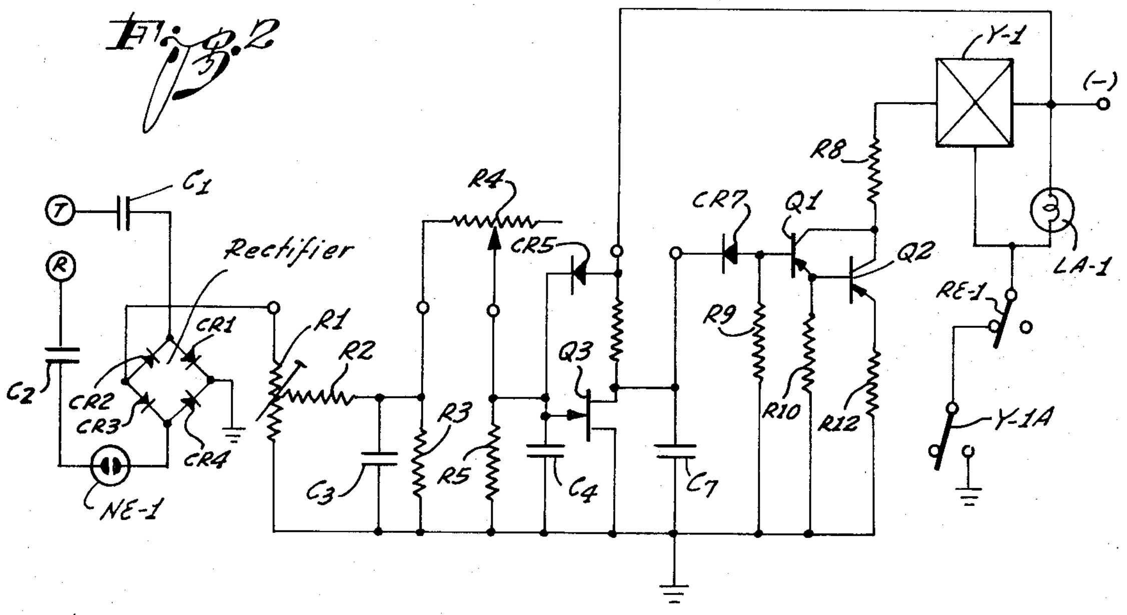
FIG. 2 is a circuit diagram of a control circuit which, in accordance with the invention, may be pre-set to respond after a given number of telephone rings have been received to activate the apparatus of FIG. 1 automatically, even though the apparatus has been turned off.

As mentioned above, in accordance with the present invention, a control system, such as shown in FIG. 2, is incorporated into the unit of FIG. 1, so that even though the power switch 18 is turned off, the system will be automatically activated after a predetermined number of telephone rings.

The circuit of FIG. 2 includes a pair of input terminals designated T, R, respectively. These terminals are connected through a pair of coupling capacitors C1 and C2 and through a neon lamp designated NE1 to a full-wave bridge rectifier formed by a series of diodes CR1, CR2, CR3, CR4 which may, for example, be of the silicon type. The capacitors C1 and C2 may each have a capacity of 0.47 microfarads.

The output from the full-wave rectifier is connected to a potentiometer R1 which may have a semi-variable control, and which may have a value, for example, 50 kilo-ohms. The potentiometer is grounded, and its variable connection is connected to a 10 kilo-ohm resistor R2. The resistor R2 is connected to a grounded 47 kilo-ohm resistor R3 and to one side of a 100 kilo-ohm potentiometer R4. The resistor R3 is shunted by a capacitor C3 which may, for example, have a capacity of 1 microfarad.

The movable tap on the potentiometer R4 is connected to a grounded resistor R5, which may have a resistance of 1 megohm, and to the gate electrode of a field effect transistor Q1. The gate electrode is connected to a grounded capacitor C4 which may have a capacity of, for example, 100 microfarads. The field effect transistor (FET) Q3 may be of the type designated 2SK24E. Its source electrode is grounded, and its drain electrode is connected to a 24 kilo-ohm resistor R6. The resistor R6 is connected to a silicon diode CR5 which, in turn, is connected back to the gate electrode. The resistor R6 is connected to the positive terminal of a source of direct current exciting potential, the negative terminal of which is grounded. A relay Y1 is also connected to the positive terminal. The relay Y1 is shunted by a reset indicator lamp LA–1. The other side of the relay Y1 is connected through a pair of normally closed reset contacts RE–1, and through a pair of normally open holding contacts Y–1A to ground.

The drain electrode of the FET Q3 is also connected to a grounded capacitor C7 which may have a capacity of 100 microfarads and through a silicon diode CR7 to the base of a PNP transistor Q1. The transistor Q1 may be of the type designated 2SB187, and its emitter is connected to the base of a similar transistor Q2. The collectors of the transistors Q1 and Q2 are connected together and to the relay Y1 through a 56 ohm resistor R8. The base of the transistor Q1 is connected to a grounded 22 kilo-ohm resistor R9, the emitter of the transistor Q1 is connected to a grounded 1 kiloohm resistor R10, and the emitter of the transistor Q2 is connected to a 2.2 ohm grounded resistor R12.

In the operation of the control circuit, the terminals T and R are connected across the telephone line, and when a ring signal is received, the neon lamp NE1 glows passing current to the full-wave rectifier CR1–CR4 and producing a full-wave rectified voltage across the potentiometer R1. By adjusting the potentiometer R1, the sensitivity of the circuit to the ring signals may be adjusted. Then, by adjusting R4, the circuit will respond, for example, after 1–10 telephone rings have been received.

Each time a telephone ring signal occurs, the capacitors C3 and C4 will assume a charge, so that after a selected number of rings, the charge on the capacitor C4 will be sufficient to render the FET Q3 conductive. When the FET Q3 becomes conductive, a bias circuit is completed to the transistor Q1. When that occurs, both the transistors Q1 and Q2 become conductive, completing a circuit to energize the relay Y1. When the relay Y1 is energized, its holding contacts Y–1A close, and the relay remains energized until it is reset by breaking the normally closed contacts RE–1. When the relay Y1 is energized, the lamp LA–1 will glow. Also, the normally open contacts Y–1C in the circuit of FIG. 3 will close, and the normally closed contacts Y–1B in the circuit of FIG. 3 will open.

As mentioned above, the circuit of FIG. 3 is a fragment of the control circuitry incorporated into the telephone answering system of FIG. 1. The telephone answering control circuitry is normally activated by closing the power switch 18. Closure of the power switch 18 completes the circuit to the transformer T1, which is the input transformer to the telephone answering unit. A microswitch AA.SW2 may be included in the circuit so that the automatic control of the system by the circuit of FIG. 2 will occur only when the system is in the "automatic answer" mode. Then, after the predetermined number of rings has occurred, and after the relay Y1 has become energized, the contacts Y–1C will close creating a connection to the transformer T1 across the power switch 18, and the contacts Y–1C will remain closed as long as the relay Y1 is energized. Also, the normally closed contacts Y–1B will open the ground connection to the timer circuit in the circuit of the telephone answering unit, so that the ring amplifier in the circuit may operate.

With the control described above, the circuit of FIG. 2 may be set to become activated after a predetermined number of rings, and thereby energize the answering unit of FIG. 1. Thereafter, and until the reset contacts RE–1 are open, the unit of FIG. 1 will be fully activated, and it will answer the phone thereafter on the first ring. The power may be supplied to the circuit of FIG. 2 by means of a half-wave rectified power supply, or any other appropriate power source may be used.

It will be evident that the circuit of FIG. 2 may be incorporated into the circuitry of the telephone answering unit of FIG. 1 to render the unit automatically responsive in the manner described above. For existing telephone answering apparatus, the circuitry of FIG. 2 may be incorporated into a separate unit which may easily and quickly be connected appropriately the the circuitry of the telephone answering systems.

Figure 3:
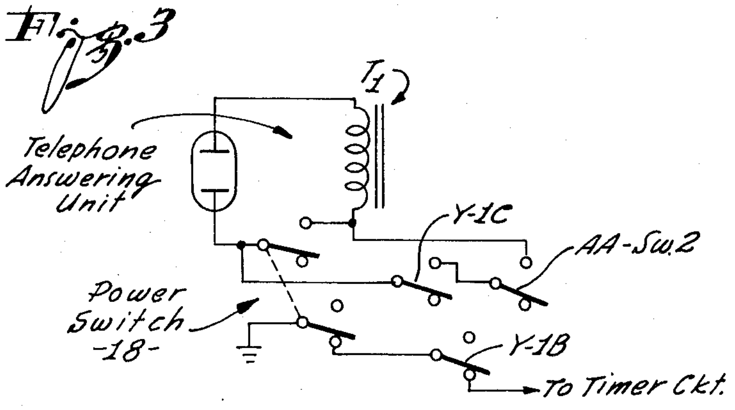
FIG. 3 is a fragment of the normal control circuitry incorporated into the unit of FIG. 1, with additional relay contacts under the control of the circuit of FIG. 2 to effectuate the aforesaid purpose.
Figure 1:
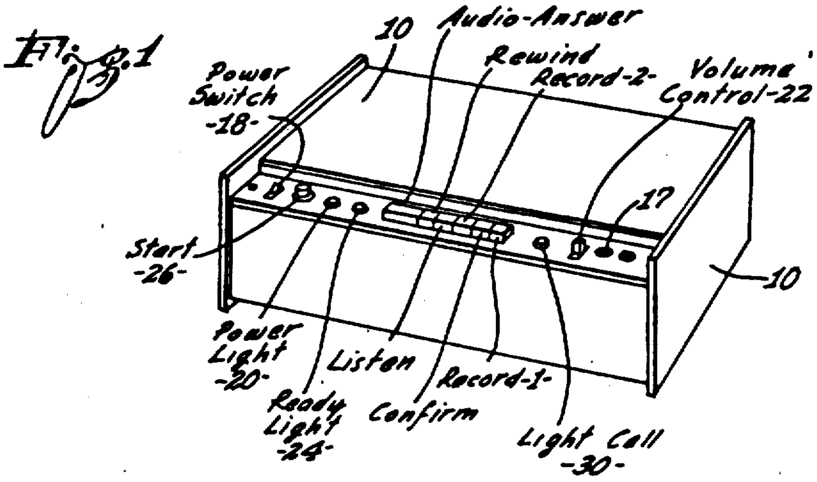
Figure 2:
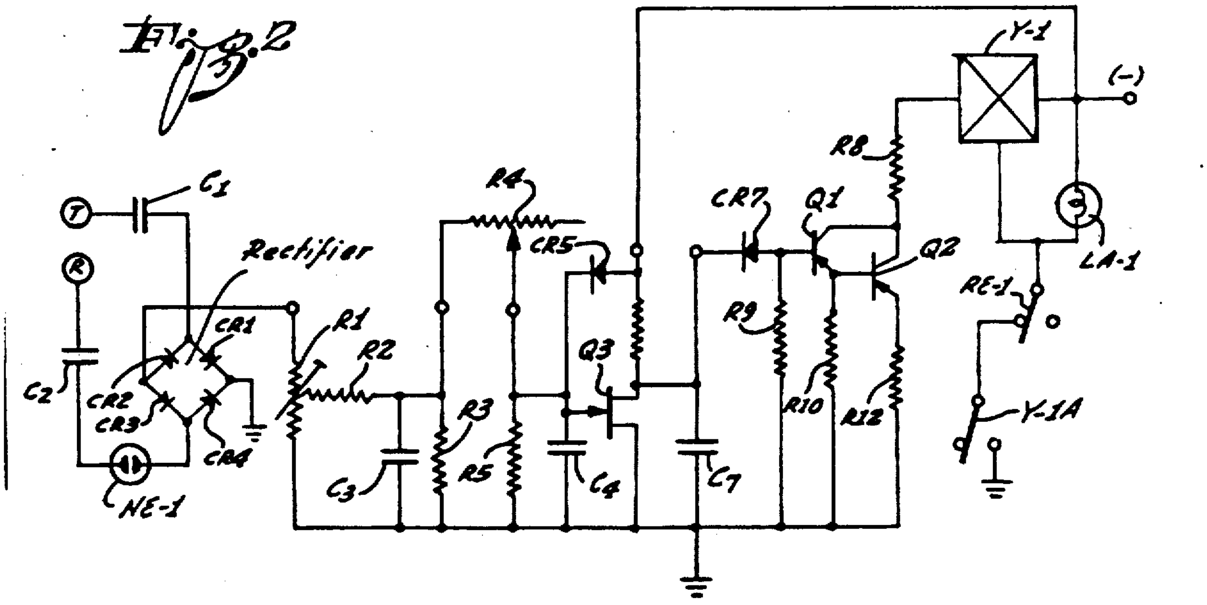
Figure 3:
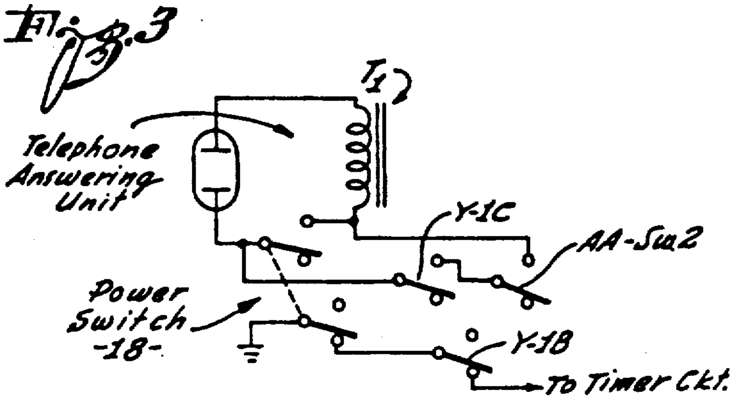

The normally open contacts Y–1B of the circuit of FIG. 3, for example, may be connected into an appropriate power relay circuit to control the activation and/or de-activation of any other electrically energized instrumentality.

It will be appreciated, of course, that while a particular embodiment of the invention has been shown and described, modifications may be made. It is intended in the claims to cover all modifications which fall within the spirit and scope of the invention.

What is claimed is:

1. In a telephone answering system which includes first circuitry for transmitting a recorded message over a telephone line in response to a ring signal, and a second circuitry for subsequently recording a message received over the telephone line from a calling party, the combination of:

means including a manually operated switch for activating and deactivating the system;

control circuit means coupled to the telephone line and responsive to incoming telephone ring signals for producing an output which rises above a particular threshold after a predetermined number of the aforesaid ring signals have been received;

relay means, connected to said control circuit means to be activated by said output therefrom, for electrically by-passing said switch when said output from said control circuit means rises above said predetermined threshold; and holding circuit means, connected to said relay means, for maintaining said relay means in an activated condition until said telephone answering system enters a reset mode.

2. The combination defined in claim 1, in which said control circuit means includes adjustable potentiometer means for establishing the aforesaid particular threshold.

* * * * *

REEXAMINATION CERTIFICATE (1454th)

United States Patent [19]

[11] B1 3,723,656

Curtis et al.

[45] Certificate Issued Apr. 30, 1991

[54] TELEPHONE ANSWERING SYSTEM

[75] Inventors: Lawrence A. Curtis, Hunting Beach; Elmer C. Bonsky, Long Beach, both of Calif.

[73] Assignee: Virsonic Corporation

Reexamination Request:
No. 90/002,003, Apr. 18, 1990

Reexamination Certificate for:

| | |
|---|---|
| Patent No.: | **3,723,656** |
| Issued: | **Mar. 27, 1973** |
| Appl. No.: | **132,961** |
| Filed: | **Apr. 12, 1971** |

[51] Int. Cl.[5] .............................................. H04M 11/10

[52] U.S. Cl. ........................................... 379/82; 379/74

[58] Field of Search ....................... 379/82, 70, 74, 77, 379/79

[56] References Cited

FOREIGN PATENT DOCUMENTS 42-17452 9/1967 Japan .

*Primary Examiner*—Stuart S. Levy

[57] ABSTRACT

A control system is provided which is constructed to activate automatically a telephone answering unit, or any other electrical device, after a predetermined number of telephone rings. The control system to be described includes an electronic circuit which responds to the incoming telephone rings, and which may be adjusted to energize a relay after predetermined number of rings, the relay serving to short circuit the power switch of the controlled instrument, and to maintain the controlled instrument in an energized state.

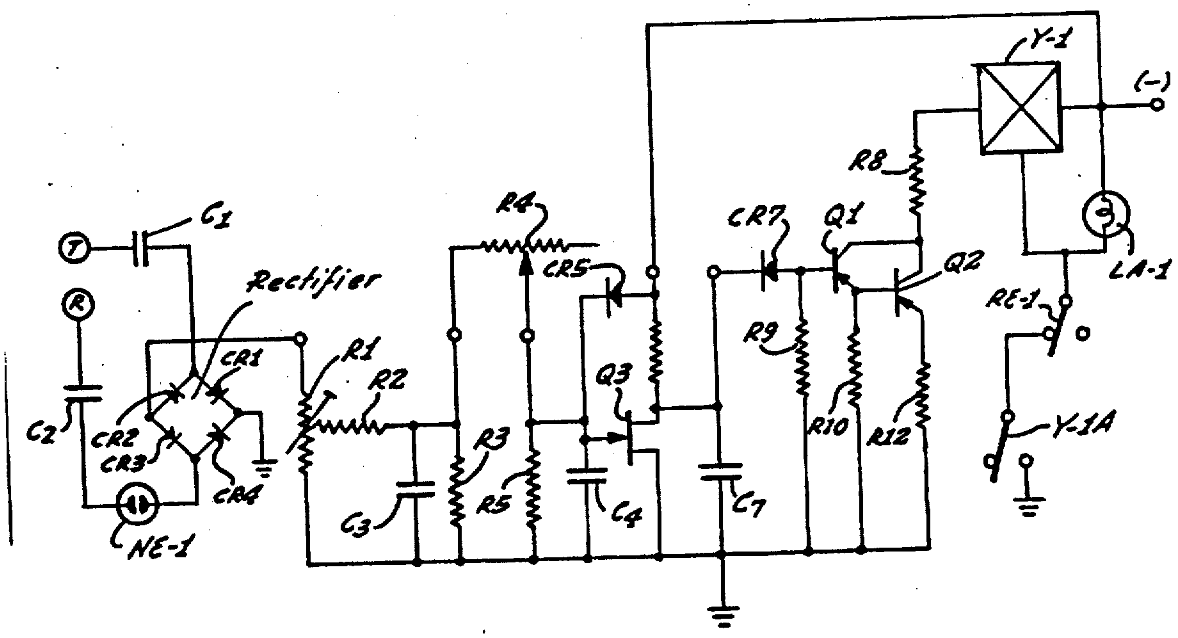

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 2 is confirmed.

* * * * *